(12) United States Patent
De Bois et al.

(10) Patent No.: US 10,788,207 B2
(45) Date of Patent: Sep. 29, 2020

(54) DEVICE AND METHOD FOR TREATING FLUE GASES

(71) Applicant: S. A. Lhoist Recherche et Developpement, Ottignies-Louvain-la-Neuve (BE)

(72) Inventors: Kevin De Bois, Vedrim (BE); Donatien Laloux, Dorinne (BE)

(73) Assignee: S.A. Lhoist Recherche et Developpement, Ottignies-Louvain-la-Neuve (BE)

(*) Notice: Subject to any disclaimer, the term of this patent is extended or adjusted under 35 U.S.C. 154(b) by 77 days.

(21) Appl. No.: 15/735,690

(22) PCT Filed: Jun. 21, 2016

(86) PCT No.: PCT/EP2016/064311
§ 371 (c)(1),
(2) Date: Dec. 12, 2017

(87) PCT Pub. No.: WO2016/207159
PCT Pub. Date: Dec. 29, 2016

(65) Prior Publication Data
US 2018/0347812 A1     Dec. 6, 2018

(30) Foreign Application Priority Data
Jun. 22, 2015   (BE) .................................. 2015/5378

(51) Int. Cl.
*F23J 15/00*   (2006.01)
*B01D 53/83*   (2006.01)
*B01D 53/50*   (2006.01)

(52) U.S. Cl.
CPC .......... *F23J 15/003* (2013.01); *B01D 53/504* (2013.01); *B01D 53/508* (2013.01); *B01D 53/83* (2013.01);
(Continued)

(58) Field of Classification Search
None
See application file for complete search history.

(56) References Cited

U.S. PATENT DOCUMENTS 4,842,834 A      6/1989   Burton
2009/0246117 A1  10/2009  Tilquin et al.
(Continued)

FOREIGN PATENT DOCUMENTS

EP    0337073 A2    10/1989
EP    1890081 A2     2/2008
(Continued)

*Primary Examiner* — Anita Nassiri-Motlagh
(74) *Attorney, Agent, or Firm* — Whitaker Shalk Swindle & Schwartz PLLC; Charles Gunter

(57) ABSTRACT

Device (10) for injecting powders into a furnace pipe (500), comprising a chamber (230) connected to a peripheral pipe (220) and, on the other hand, to the said furnace pipe via the said peripheral pipe (220), which comprises a first part (221) of diameter DP1, and a second part (222) of diameter DP2, having a downstream end (222a) and intended to be in communication with the furnace pipe, and a powder conveying pipe (120) which has a diameter DT and a downstream end (121), characterized in that the second part of the peripheral pipe has a length L≥the diameter (DP2) of the second part of the peripheral pipe, and in that the diameter (DT) and the diameter (DP2) are connected by the relationship 0<DP2−DT<½ DT.

22 Claims, 6 Drawing Sheets

(52) U.S. Cl.
CPC .. *B01D 2251/402* (2013.01); *B01D 2251/404* (2013.01); *B01D 2251/604* (2013.01); *B01D 2251/606* (2013.01); *B01D 2257/2042* (2013.01); *B01D 2257/2045* (2013.01); *B01D 2257/2047* (2013.01); *B01D 2257/2064* (2013.01); *B01D 2257/302* (2013.01); *B01D 2257/602* (2013.01); *B01D 2258/0283* (2013.01); *B01D 2259/128* (2013.01); *F23J 2215/20* (2013.01); *F23J 2215/301* (2013.01); *F23J 2215/60* (2013.01)

(56) References Cited

U.S. PATENT DOCUMENTS

2013/0125749 A1* 5/2013 Benson ............... B01D 53/12
                                                                              95/108
2014/0134086 A1 5/2014 Hamel et al.

FOREIGN PATENT DOCUMENTS

| JP | 2002263447 A | 9/2002 |
|----|--------------|--------|
| JP | 2003159512 A | 6/2003 |
| JP | 2015085303 A | 5/2015 |
| WO | 0073519 A1 | 12/2000 |
| WO | 2016207159 A1 | 12/2016 |

\* cited by examiner

Phi=7.10⁻³

Phi=7.10⁻³            Phi=4.10⁻³

DEVICE AND METHOD FOR TREATING FLUE GASES

The present invention relates to a method for treating combustion flue gases, also called method for treating flue gases, in a furnace pipe with a powdered compound and the device for its implementation.

In the present Invention, furnace pipe means the post-combustion zone (also called boiler) and/or any pipe or any device through which flue gases pass, downstream of the post-combustion zone and upstream of the chimney for evacuating said flue gases.

The method and the device at which the present invention is aimed can be used in the treatment of the flue gases from combustion of conventional fuels or substitution fuels, liquid or solid. These combustions or thermal treatments are carried out in chambers such as boilers, furnaces, incinerators, without this being limiting, which will indifferently be called furnaces hereinafter.

These combustions produce high-temperature flue gases that are generally evacuated into the atmosphere by a chimney. Besides the fly ash, these flue gases generally comprise acidic gases such as HCl, HF, $SO_2$, $SO_3$, . . . and other pollutants such as heavy metals (Hg, . . . ), dioxins and/or furans. These gases are harmful to the environment and to health, and it is desirable to eliminate them before evacuating the flue gases into the atmosphere.

For this purpose, a known method, called abatement, involves the injection of powdered reactants, in the furnace pipe, into the flue gases. Such compounds include in particular calcium-magnesium compounds, such as powdered hydrated lime, or carbon compounds such as activated carbon or lignite coke, for example. Powdered hydrated lime, also called slaked lime, means a set of solid particles mainly consisting of $Ca(OH)_2$ calcium hydroxide. Other mineral compounds can also be used such as sodium compounds such as a carbonate or a bicarbonate of sodium or the compounds used for the abatement of dioxins, furans and/or heavy metals including mercury, for example such as, those containing phyllosilicates, like sepiolite or halloysite or the equivalent.

Such an abatement method, however, imposes numerous constraints, in terms of transportation flow rate, injection flow rate and radial dispersion of the powdered compound in the furnace pipe, that are currently difficult to reconcile.

First of all, the injection of the powder (powdered compound) Into the furnace pipe must be carried out at a flow rate greater than the flow rates of the flue gases present in said furnace pipe, in order to prevent the powder from dispersing poorly therein and, in certain cases, agglomerating against the walls of the furnace pipe, under the effect of a pressure of these gases that is too great. The speed of such flue gases can reach over 30 m/s, or even over 50 m/s.

Secondly, the transportation of the powder to the point of injection Into the furnace pipe must be carried out at speeds of approximately 15 to 20 m/s, greater speeds carrying the risk of leading to phenomena of friction/attrition and/or clogging of the powder in the transportation pipe, and the latter phenomenon can also lead, when the powder contains slaked lime, to carbonatation of said powder.

Finally, the powder must be dispersed homogeneously over the entire transverse cross-section of the furnace pipe (with respect to the flow of the flue gases in the furnace pipe) in order to allow homogeneous and efficient abatement of the gaseous pollutants. This dispersion is dependent in particular on the size of the furnace pipe and on the flow rate of the gases that pass through it. Such a pipe generally has, at its centre, "veins", namely zones in which the speed of the flue gases is greater, which has a negative effect on the homogeneous distribution of the powder in the furnace pipe. In order to overcome these problems of dispersion, "penetrating nozzles", that is to say, metal ducts that penetrate the furnace pipe and that are therefore entirely subjected to the flue gases, are currently used.

Nevertheless, these "penetrating nozzles" still have numerous disadvantages.

First of all, it is very difficult for them to resist the temperature and acidity conditions to which they are exposed in the furnace pipe and they have a very limited service life, in particular less than one month when they are subjected to high temperatures. They thus require frequent replacement, which, in addition to generating non-negligible operating costs, requires stopping the furnace, sometimes for several days. Restarting the combustion after each stoppage of the furnace, in order to replace the penetrating nozzles, is problematic when these furnaces do not rapidly and easily reach their equilibrium during combustion.

These "penetrating nozzles" are also subject to inner clogging because of the properties of the powdered compound and its agglomerating power.

Consequently, these "penetrating nozzles", although allowing good dispersion of the powder in the furnace pipe, pose numerous implementation problems, in particular in terms of maintenance, that are not very compatible with the intended use since said nozzles do not allow optimal operation of the furnace.

Document US 2013/0125749 describes a device and a method for abatement of acidic gases and heavy metals in a furnace pipe using a nozzle for transporting an absorbent and a nozzle for injecting peripheral air, these nozzles being concentric and opening onto the inner surface of the furnace pipe. However, this method and this device have disadvantages.

First of all, they can be used at flue gas temperatures less than or equal to 454° C. (850° F.). Such temperatures do not always allow optimal abatement conditions to be reached. Indeed, the optimal temperature for abatement of gaseous pollutants is dependent in particular on the nature of the pollutant to be abated and on the nature of the powdered compound used. For example, in the case of a powdered compound containing slaked lime, it was noted that the reaction between the powdered slaked lime and the gaseous $SO_2$ can be promoted in particular in the temperature range between 850° C. (1562° F.) and 1150° C. (2102° F.).

Moreover, this document suggests using very high peripheral air flow rates, up to 6,000 $m^3/h$, leading to a ratio of mass flow rate of peripheral air to flow rate of the flue gases between 3 and 5%. Such flow rates will inevitably disturb the overall operation of the facility for treating the flue gases.

Indeed, with peripheral air flow rates that are so high, compared to the flow rate of the flue gases, the quantity of air added to the flue gases is non-negligible and leads in particular to undesired cooling of these flue gases, thus reducing the overall energy performance of the furnace. Such a device also has the effect of increasing the total flow rate and the oxygen concentration of the flue gases located downstream of said device, thus forcing the operator to modify the line for treating the flue gases accordingly.

There are also methods for denitrification of the flue gases using an aqueous solution of ammonia as described in particular in the document EP0337073 that also discloses a device for implementing this method. It is obvious that methods of this type do not involve the same problems as during injection of powdered products, in particular with respect to the constraints in terms of transportation flow rate.

The goal of the present invention is therefore to overcome the disadvantages of the prior art by providing a device for treating flue gases with a powdered compound for abatement of pollutant that does not have the aforementioned disadvantages, namely which provides high yield in terms of abatement of pollutant without using a penetrating device and while disturbing as little as possible the overall operation of the facility for treating the flue gases.

For this purpose, a device and a method have been developed for treatment, with a powdered compound for abatement of pollutants, of flue gases in a furnace pipe allowing adaptation to a wide range of operating conditions, namely in terms of temperature of the flue gases to be treated, nature of the pollutant to be abated and nature of the powdered compound used, without substantially modifying the other characteristics of the flue gases to be treated (in particular their flow rate and their temperature).

Thus, according to a first object, the inventions relates to a device for injecting a powdered compound for abatement of pollutants of flue gases into a furnace pipe, said device comprising:
  a chamber connected to a peripheral pipe and arranged to be connected to a first blowing element arranged to blow a peripheral gas into said chamber and into said peripheral pipe, and to said furnace pipe via said peripheral pipe,
  said peripheral pipe comprising a first portion having a diameter DP1, connected to the chamber, and a second portion having a diameter DP2, opposite the first portion, having a downstream end, and intended to be in communication with the furnace pipe,
  a pipe for transporting a powdered compound, intended to be connected to a second blowing element arranged to blow a transportation gas into said transportation pipe, simultaneously to the jet of peripheral gas, said transportation pipe having a diameter DT and a downstream end,
  said transportation pipe passing through said first portion of the peripheral pipe concentrically and longitudinally, in such a way that the downstream end of said transportation pipe is located in a secant plane between the first and the second portion of the peripheral pipe.

This device according to the present invention is characterised in that the second portion of the peripheral pipe has a length L greater than or equal to the diameter (DP2) of the second portion of the peripheral pipe and in that the diameter (DT) of the transportation pipe and the diameter (DP2) of the second portion of the peripheral pipe are linked by the following relationship:

$$0 < DP2 - DT < \tfrac{1}{2} DT.$$

According to the present invention, the terms "downstream" and "upstream" are used in reference to the direction of flow of the flue gases. For example, if a gas travels through a pipe in one direction of flow, it will enter via an upstream end of the pipe and exit via a downstream end of the pipe.

According to the present invention, the transportation gas and/or the peripheral gas are preferably the ambient air of the atmosphere, independently of each other.

Indeed, according to the present invention, transportation gas means any gas, in particular air, that allows the powdered compound to be carried, via pneumatic transport, in the transportation pipe, towards the furnace pipe.

According to the present invention, peripheral gas means any gas, in particular air, that is brought into the peripheral pipe, on the periphery of the transportation pipe.

The presence of the chamber, connected to the peripheral pipe, and the fact that the transportation pipe passes through it impermeably allows two coaxial jets of gas to be formed; a flow for transporting powdered compound and a flow of peripheral gas. Moreover, the presence of the second portion, having a length L, of the peripheral pipe and the relative proportions of the diameters of the transportation pipe (DT) and of the second portion of the peripheral pipe (DP2) allow a Venturi effect to be created and the jets of gas to be accelerated at the output of the device, thus improving the penetrability of the powdered compound injected into the furnace pipe. Thus, it is possible to distribute the powder in the furnace pipe in an optimal manner without having to use an invasive device, contrary to the "penetrating nozzles" of the prior art, and while reducing the quantity of peripheral gas necessary to allow good penetration of the powdered abatement compound in the furnace pipe, contrary to the device and the method of the prior art US 2013/0125749.

Reducing the quantity of peripheral gas allows the disturbance of the properties of the flue gases (in particular their temperature, their flow rate and their oxygen concentration) to be limited, contrary to the device of document US 2013/0125749, the latter requiring a very high flow rate of peripheral air.

Thus, the present invention also allows the recovery of the calories present in the flue gases to be improved, since the jet of peripheral gas cools the flue gases much less before their recovery. It also allows the optimal temperature conditions promoting the abatement of the pollutants by the powdered compound injected to be approached and maintained.

Indeed, as mentioned above, certain ranges of a specific temperature allow the reaction of abatement of gaseous pollutants to be promoted. These optimal temperature ranges are dependent in particular on the nature of the pollutant to be abated and on the nature of the powdered compound used. The present invention, due to the low flow rate of peripheral air used, allows the temperature of the flue gases to not be substantially modified, in particular at the point of injection of the powdered compound, and thus guarantees that the optimal reaction temperature is maintained.

In a specific embodiment of the present invention, the diameter DP1 is greater than or equal to the diameter DP2.

In another specific embodiment of the present invention, the diameter DP1 is less than or equal to the diameter DP2.

Advantageously, the downstream end of the second portion of the peripheral pipe is directly connected to the furnace pipe.

In another advantageous embodiment of the present invention, the peripheral pipe can further comprise a third portion comprising an upstream portion provided with an upstream end and a downstream portion provided with a downstream end, having a diameter DP3 less than the diameter DP2, said upstream end being intended to be connected to the downstream end of the second portion of the peripheral pipe, said downstream end being intended to be connected to the furnace pipe.

This specific embodiment allows a second Venturi effect to be created, thus further improving the phenomenon of acceleration of the jets of gas at the output of the device and thus the penetrability of the powdered compound in the furnace pipe.

Preferably, the downstream end of the third portion of the peripheral pipe is directly connected to the furnace pipe.

The term "directly connected to the furnace pipe" means that the downstream end of the second portion or of the third portion of the peripheral pipe ends at the furthest at the inner wall of said furnace pipe. Although in the context of an industrial device, it cannot be totally excluded that the downstream end of the second portion or of the third portion of the peripheral pipe extends not insignificantly beyond the inner wall after having passed through thickness of the furnace pipe, according to the present invention, it is intended more for the downstream end of the second portion or of the third portion of the peripheral pipe to end in the thickness of the furnace pipe or for the downstream end of the second portion or of the third portion of the peripheral pipe to be connected to the outer surface of the furnace pipe.

Advantageously, said upstream portion of the third portion of the peripheral pipe has the shape of a truncated cone.

According to a preferred embodiment, said powdered compound is a calcium-magnesium compound having the formula $aCaCO_3.bMgCO_3.xCaO.yMgO.zCa(OH)_2.tMg(OH)_2.ul$, where l represents impurities, a, b, x, y, z, t and u being mass fractions each between 0 and 100%, with u≤5%, with respect to the total weight of said calcium-magnesium compound, the sum of the mass fractions a+b+x+y+z+t+u being equal to 100% of the total weight of said calcium-magnesium compound.

Advantageously, said powdered compound is a calcium-magnesium compound having the formula $aCaCO_3.bMgCO_3.xCaO.yMgO.zCa(OH)_2.tMg(OH)_2.ul$, where l represents impurities, a, b, x, y, z, t and u being mass fractions each between 0 and 100%, with u≤3%, preferably u≤2%, in particular u≤1% with respect to the total weight of said calcium-magnesium compound, the sum of the mass fractions a+b+x+y+z+t+u being equal to 100% of the total weight of said calcium-magnesium compound.

According to these preferred embodiments, the performance of the device for abatement of flue gases is further improved for the abatement of the pollutants, in particular of $SO_2$, at high temperature. Indeed, the calcium-magnesium compounds are particularly effective in the range of temperatures of flue gases from 850° C. to 1150° C., especially when trapping acidic pollutants such as $SO_x$, often more difficult to trap efficiently. On the contrary, according to the teaching of document US 2013/0125749, this result could not in any way be obtained because of the low temperatures (less than 454° C.) present at the location the powdered compound is put in contact, temperatures at which it is especially the reaction of the lime with the $CO_2$ that is promoted, in the case of a calcium-magnesium compound in the form of calcium hydroxide.

In another advantageous embodiment of the present invention, the powdered compound can be chosen from the calcium-magnesium compounds defined above, carbon compounds, such as activated carbon or lignite coke, sodium mineral compounds, such as sodium carbonate or sodium bicarbonate, mineral compounds containing phyllosilicates, such as sepiolite or halloysite, and their mixtures.

Advantageously, the device according to the present Invention further comprises:
- a first blowing element connected to the chamber and arranged to blow a peripheral gas into said chamber and into the peripheral pipe,
- a second blowing element connected to the transportation pipe and arranged to blow a transportation gas into said transportation pipe,
- a means for dosing powdered compound, connected to a tank of powdered compound and to the transportation pipe, downstream of said second blowing element with respect to a direction of flow of the transportation gas, arranged in order for the transportation gas to drive the dosed powdered compound.

Advantageously, in the device according to the present invention, said first blowing element and the second blowing element comprise means of adjustments of flow rates in such a way that the flow rates of the first blowing element and of the second blowing element can be adjusted separately.

This feature provides the device with good flexibility of use, allowing it to be adapted to a large range of characteristics of the flue gases (temperature, speed, pollutants . . . ), of pipe diameter and of powdered abatement compound used.

Advantageously, the tank of powdered abatement compound can be a tank of calcium-magnesium compound having the formula $aCaCO_3.bMgCO_3.xCaO.yMgOCaO.yMgO.zCa(OH)_2.tMg(OH).ul$, where l represents impurities, a, b, x, y, z, t and u being mass fractions each between 0 and 100%, with u≤5%, with respect to the total weight of said calcium-magnesium compound, the sum of the mass fractions a+b+x+y+z+t+u being equal to 100% of the total weight of said calcium-magnesium compound.

Advantageously, the tank of powdered abatement compound can be a tank of calcium-magnesium compound having the formula $aCaCO_3.bMgCO_3.xCaO.yMgO.zCa(OH)_2.tMg(OH)_2.ul$, where l represents Impurities, a, b, x, y, z, t and u being mass fractions each between 0 and 100%, with u≤3%, preferably u≤2%, in particular u≤1% with respect to the total weight of said calcium-magnesium compound, the sum of the mass fractions a+b+x+y+z+t+u being equal to 100% of the total weight of said calcium-magnesium compound.

Preferably, the calcium-magnesium comprises at least hydrated lime.

In another advantageous embodiment of the present invention, the tank of powdered abatement compound can be a tank of powdered abatement compound chosen from the calcium-magnesium compounds defined above, carbon compounds, such as activated carbon or lignite coke, sodium mineral compounds, such as sodium carbonate or sodium bicarbonate, mineral compounds containing phyllosilicates, such as sepiolite or halloysite, and their mixtures.

In practice, a plurality of devices for injecting powdered compound as defined above can be used in order to form a system for injecting powdered compound.

Other features and advantages of the device according to the present invention are mentioned in the appended claims.

According to a second object, the invention relates to a furnace pipe provided with at least one device for injecting a powdered abatement compound as defined above.

Other features and advantages of the furnace pipe according to the present invention are mentioned in the appended claims.

According to a third object, the invention relates to a method for treating flue gases in a furnace pipe with a powdered compound for abatement of pollutants of flue gases, comprising:
- Injection of a jet of transportation gas having a mass flow rate $Q_T$, said jet of transportation gas being intended to transport said powdered abatement compound into said flue gases having a flue gas flow rate $Q_F$,
- simultaneously, injection of a jet of gas, peripherally with respect to the jet of transportation gas, forming a jet of peripheral gas having a mass flow rate $Q_P$.

This method is characterised in that said mass flow rate of peripheral gas in relation to said mass flow rate of the flue gases forms a ratio QP/QF between 0.05% and 0.25%.

The method according to the present invention allows the "penetrating nozzles", that it to say, the metal ducts that penetrate the furnace pipe, and all the problems related thereto to be eliminated. It allows the constraints of transportation and injection of the powder to be conciled and the radial distribution of said powder to be controlled in order to reach the desired zones in the furnace pipe, without it being necessary to use an invasive device such as a penetrating nozzle.

Moreover, because of a very low ratio of the flow rate of peripheral gas with respect to the mass flow rate of the flue gases, it allows the characteristics of the flue gases of the furnace (in particular in terms of temperature, flow rate, and oxygen concentration) to not be substantially modified thus ensuring that the optimal temperature of the reaction of abatement is maintained while also preventing the overall energy performance of the furnace from being reduced and the overall operation of the facility for treating these flue gases from being disturbed.

On the contrary, document US 2013/0125749 teaches using a dearly greater flow rate ratio in order to create turbulence in order to disperse the flow of powdered compound (mix) and form eddies of powdered compound in the flow of carrier gas and incidentally in the flow of flue gases.

In a preferred embodiment of the method according to the present invention, said transportation gas has a speed $V_T$ and said peripheral gas has a speed $V_P$, the speed of peripheral gas $V_P$ being between two times and twenty times the speed of the transportation gas $V_T$ according to $2V_T \leq V_P \leq 20V_T$.

In a specific embodiment of the present invention, the mass flow rate of the transportation gas $Q_T$ added to the mass flow rate of the peripheral gas $Q_P$ in relation to the mass flow rate of the flue gases $Q_F$ forms a ratio $(Q_T+Q_P)/Q_F$ between 0.1 and 0.5%. Thus, the ratio of the sum of the mass flow rates of the transportation gas and peripheral gas to the mass flow rate of the flue gases is between 0.1 and 0.5%.

Advantageously, the powdered compound is Injected at a mass flow rate $Q_A$, the mass flow rate of the transportation gas $Q_T$ in relation to the mass flow rate of powdered compound forming a ratio $Q_T/Q_A$ between 5 and 10. Thus, the ratio of the mass flow rate of transportation gas to the mass flow rate of powdered compound can be between 5 and 10.

In a preferred embodiment of the method according to the invention, the Injection of the jets of transportation gas and of peripheral gas occurs at the inner face of the furnace pipe.

Advantageously, in the method according to the present invention, the temperature of the flue gases to be treated is between 850° C. and 1150° C.

Moreover, in the method according to the present invention, the speed of the flue gases to be treated is between 2 m/s and 150 m/s, preferably between 3 and 50 m/s, in particular between 5 and 30 m/s In a preferred embodiment, the speeds of the jets of transportation gas and of peripheral gas are adjusted independently of each other.

Advantageously, in the method according to the present invention, the transportation gas and/or the peripheral gas is/are air, independently of one another.

In a method for abatement of pollutants, such as the method according to the present invention, the flue gases comprise pollutants chosen from the group consisting of the acidic gases, namely sulphurated and/or halogenated, the heavy metals, the furans, the dioxins and their mixtures.

More particularly, in the method according to the present invention, the acidic gases comprise pollutants chosen from the group consisting of $SO_2$, $SO_3$, HCl, HF, HBr, and their mixtures.

In an advantageous embodiment of the present invention, the powdered compound can be chosen from calcium-magnesium compounds, carbon compounds, such as activated carbon or lignite coke, sodium mineral compounds, such as sodium carbonate or sodium bicarbonate, mineral compounds containing phyllosilicates, such as sepiolite or halloysite, and their mixtures.

Advantageously, the powdered abatement compound used in the method according to the present invention, comprises a carbonate, a hydroxide and/or an oxide of an alkaline earth metal chosen from calcium and magnesium, or a mixture thereof.

Preferably, the powdered abatement compound comprises a calcium-magnesium compound having the formula $aCaCO_3 \cdot bMgCO_3 \cdot xCaO \cdot yMgOzCa(OH)_2 \cdot tMg(OH) \cdot ul$, where l represents impurities, a, b, x, y, z, t and u being mass fractions each between 0 and 100%, with $u \leq 5\%$, with respect to the total weight of said calcium-magnesium compound, the sum of the mass fractions a+b+x+y+z+t+u being equal to 100% of the total weight of said calcium-magnesium compound.

Advantageously, said powdered compound is a calcium-magnesium compound having the formula $aCaCO_3 \cdot bMgCO_3 \cdot xCaO \cdot yMgOzCa(OH)_2 \cdot tMg(OH)_2 \cdot ul$, where l represents impurities, a, b, x, y, z, t and u being mass fractions each between 0 and 100%, with $u \leq 3\%$, preferably $u \leq 2\%$, in particular $u \leq 1\%$ with respect to the total weight of said calcium-magnesium compound, the sum of the mass fractions a+b+x+y+z+t+u being equal to 100% of the total weight of said calcium-magnesium compound.

According to a preferred embodiment of the method according to the present invention, the powdered compound comprises over 50% by weight, namely over 90% by weight, $Ca(OH)_2$ calcium hydroxide.

Other features and advantages of the method according to the present Invention are mentioned in the appended claims.

Other features, details and advantages of the invention will be clear from the description given below, in a non-limiting manner and in reference to the examples and to the appended figures.

FIG. 1 is an example of a first embodiment of a device 10 for injection of a powdered compound according to the invention. A furnace (not shown) produces flue gases comprising gaseous pollutants that are transported by a furnace pipe 500 to a chimney (not shown) in order to evacuate them into the atmosphere.

Figure 1:
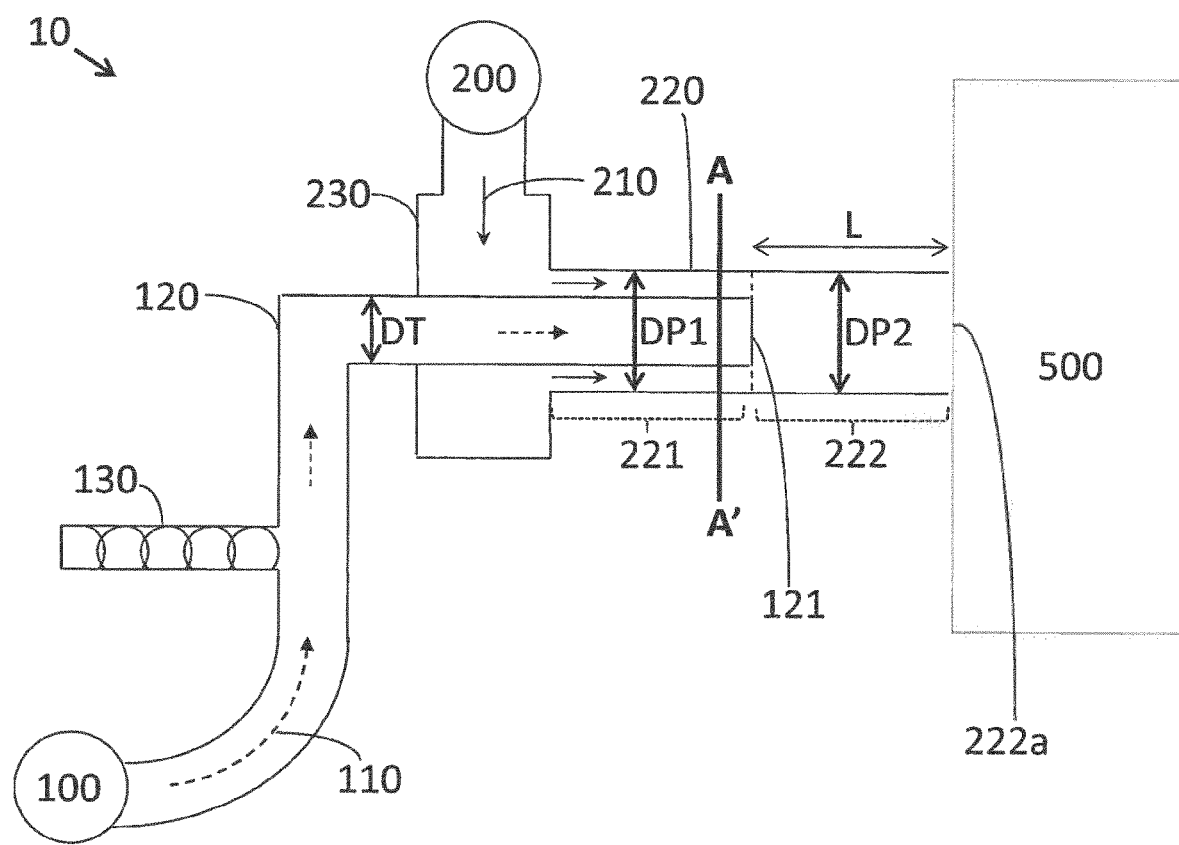
FIG. 1 shows a functional diagram of an embodiment of an injection device allowing the method according to the invention to be implemented.

During operation, the injection device according to the invention generates two flows of gas:
- a flow of gas called transportation gas 110, created by a blower 100 having an adjustable flow rate, (lateral blower in the example illustrated); this flow of transportation gas circulates in a transportation pipe 120 connected to the blower; on the path of this transportation flow, there is a system 130 for dosing powdered compound, connected to a tank of powdered compound (not shown), in such a way that the transportation flow is loaded with powdered compound;
- a flow of gas called peripheral gas 210 created by a blower 200 having an adjustable flow rate; this flow of peripheral gas is delivered into a chamber 230 and then circulates in a peripheral pipe 220 connected to this chamber.

The transportation pipe 120 passes through the chamber 230 impermeably and exits therefrom concentrically to the peripheral pipe 220 inside said pipe. It is interrupted at its upstream end 121 located in a secant plane between the first portion 221 and the second portion 222 of the peripheral pipe 220.

Figure 1A:
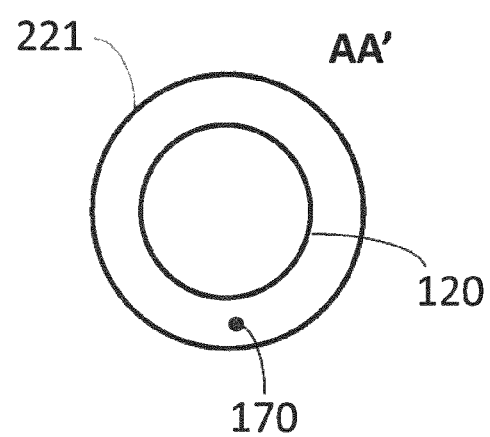
FIG. 1A shows a cross-sectional view along the cutting line A-A' in FIG. 1.

As illustrated by the cross-section A-A' of FIG. 1A, there is therefore an annular space 170, between the axial transportation pipe 120 and the first portion 221 of the peripheral pipe, in which the flow of peripheral gas 210 circulates, the flow of transportation gas 110 circulating in the transportation pipe 120. The device thus provides two jets of gas in the furnace pipe, an axial jet of transportation gas 110, loaded with powdered compound, and a jet of peripheral gas 210 that surrounds the jet of transport gas.

Figure 2:
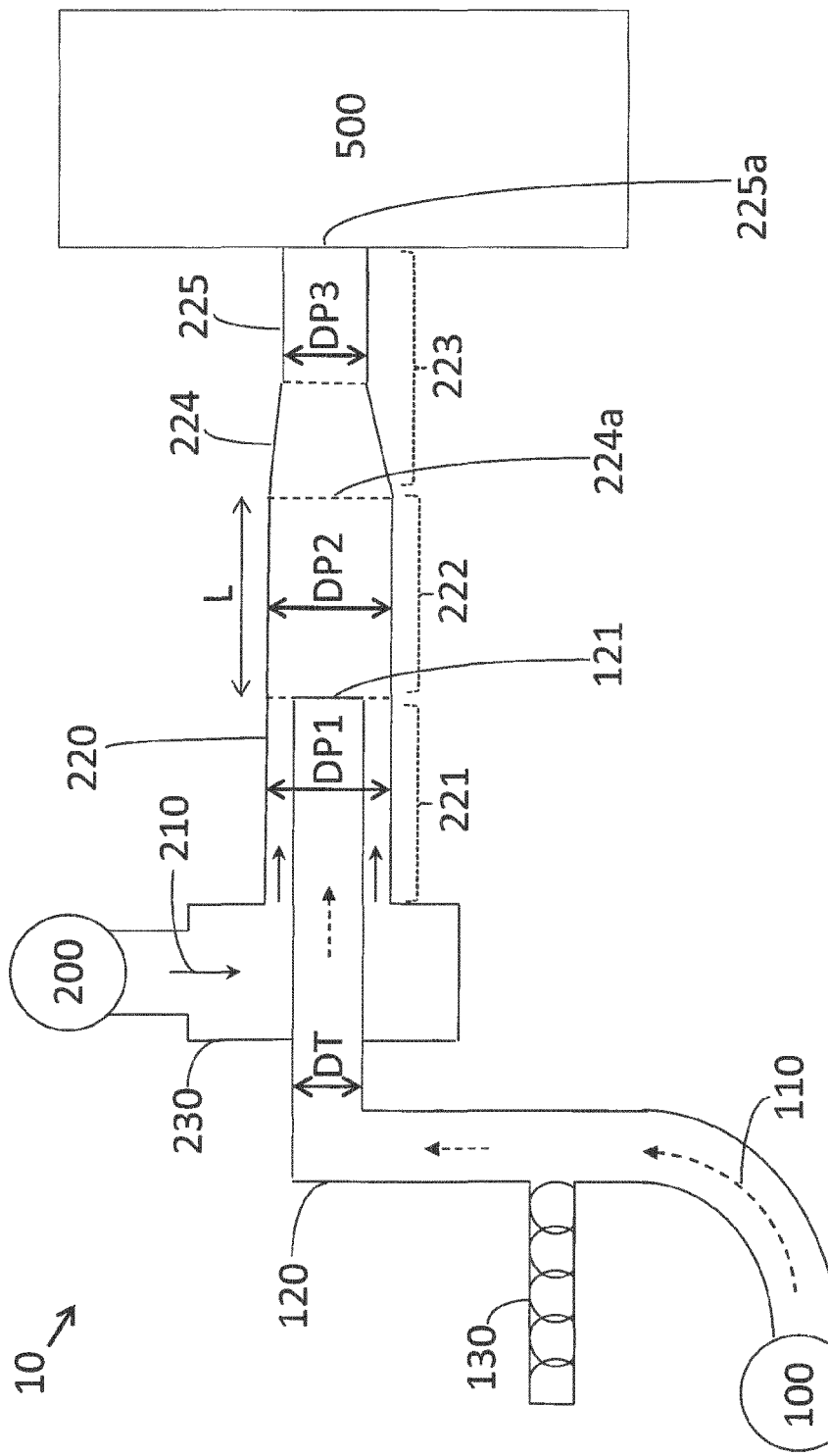
FIG. 2 shows a functional diagram of another embodiment of an injection device allowing the method according to the invention to be implemented.

In a particular embodiment of the present invention, illustrated in FIG. 2, the peripheral pipe 220 further comprises a third portion (223) comprising an upstream portion (224) provided with an upstream end (224a) and a downstream portion (225) provided with a downstream end (225a), having a diameter DP3 less than the diameter DP2, said upstream end being intended to be connected to the downstream end of the second portion of the peripheral pipe, said downstream end being intended to be connected to the furnace pipe.

Advantageously, said upstream portion (224) of the third portion of the peripheral pipe has the shape of a truncated cone.

The shrinking of the diameter of the peripheral pipe 220 in its third portion 223 causes, via conservation of mass, a second Venturi effect allowing an additional acceleration of the flows of the transportation gas and peripheral gas and thus an additional improvement of the penetrability of the powdered compound in the furnace pipe.

In general, the peripheral pipe 220 is connected to the furnace pipe 500 radially. The flow of peripheral gas 210, peripheral to the flow of transportation gas 110, maintains the shape of and guides this flow of transportation gas 110 until they penetrate the furnace pipe 500, allowing the central vein of the furnace pipe 500 to be reached without the need for a penetrating nozzle.

Moreover, since the flow rates of the blowers 100 and 200 can be adjusted separately, the device allows adaptation to a large variety of conditions of use, namely in terms of speed of the flue gases, concentration of acidic gases, diameter of the pipe, . . .

Of course, the invention covers different shapes of the device, provided that at the inlet of the furnace pipe, a jet of transportation gas 110 loaded with powdered abatement material and a jet of peripheral gas 210 are obtained. For example, in FIGS. 1 and 3 of the present application, the peripheral pipe 220 is connected to the furnace pipe 500 perpendicularly, in other words with an angle of 90° between the axes of the two pipes. Alternatively, this peripheral pipe 220 could obviously be connected to the furnace pipe 500 with an angle between the axes of the two pipes that is greater than or less than 90°.

Digital Simulations

In order to demonstrate the effectiveness of the device and of the method according to the present Invention, digital simulations of distribution of powdered slaked lime in a furnace pipe containing flue gases were carried out while considering various injection devices. More precisely, the distribution of the lime obtained using the device according to the present invention and its method was compared to that obtained with the device and the method of document US 2013/0125749, with comparable operating parameters (in other words, by setting the geometry of the furnace pipe, the composition and the speed of the flue gases that pass through it, the position and the cross-section of the duct for transporting lime, as well as the flow rate of transportation air and of lime, which is calculated theoretically with respect to the quantity of pollutants present in the flue gases, according to the performance in terms of trapping lime).

The distribution of the lime in the furnace pipe is evaluated via CFD (Computational Fluid Dynamics) using a distribution factor Phi that corresponds to the concentration of lime in the flue gases, at a given point of said pipe, when the lime Is Injected transversely.

This distribution factor is dependent in particular on the geometry of the furnace pipe and is defined as follows:

$$Phi = \frac{V_i}{V_{tot}}$$

Where $V_i$ corresponds to the volume of the powdered lime;

$V_{tot}$ corresponds to the sum of the volume of the powdered lime and of the volumes of all the gases present in the flue gases.

In the digital simulations carried out, the furnace pipe considered is in the shape of an Inverted U (see FIGS. 4 and 5) and has a square cross-section 4 m long.

In order to be able to compare the efficiency of the device of the present invention to that of the device of the prior art US 2013/0125749, the optimal distribution factor $Phi_{opt}$ must first be determined. This factor corresponds to the concentration of lime in the flue gases to be reached in order for this lime to be distributed optimally in such a way as to cover the entirety of the cross-section of the furnace pipe considered.

In the present case, this optimal distribution factor was determined by simulating a device comprising a penetrating nozzle (and thus not containing peripheral gas), at present considered to be the most efficient device in terms of distribution of powdered compound. The nozzle is inserted into the furnace pipe at a depth of 1 m.

In this configuration and for the furnace pipe considered, the optimal distribution factor $Phi_{opt}$ is approximately $7.10^{-3}$. Indeed, for this value of Phi, the distribution of the lime in this furnace pipe is optimal and is in the form of a transverse screen, covering the entirety of the cross-section of a leg of the inverted U, 50 cm above the injection point.

This situation ($Phi_{opt}=7.10^{-3}$) has therefore been considered to be the optimal distribution factor to be achieved.

Devices Studied:

a) Device and method according to the present invention.

b) Device and method according to document US 2013/0125749.

Figure 4:
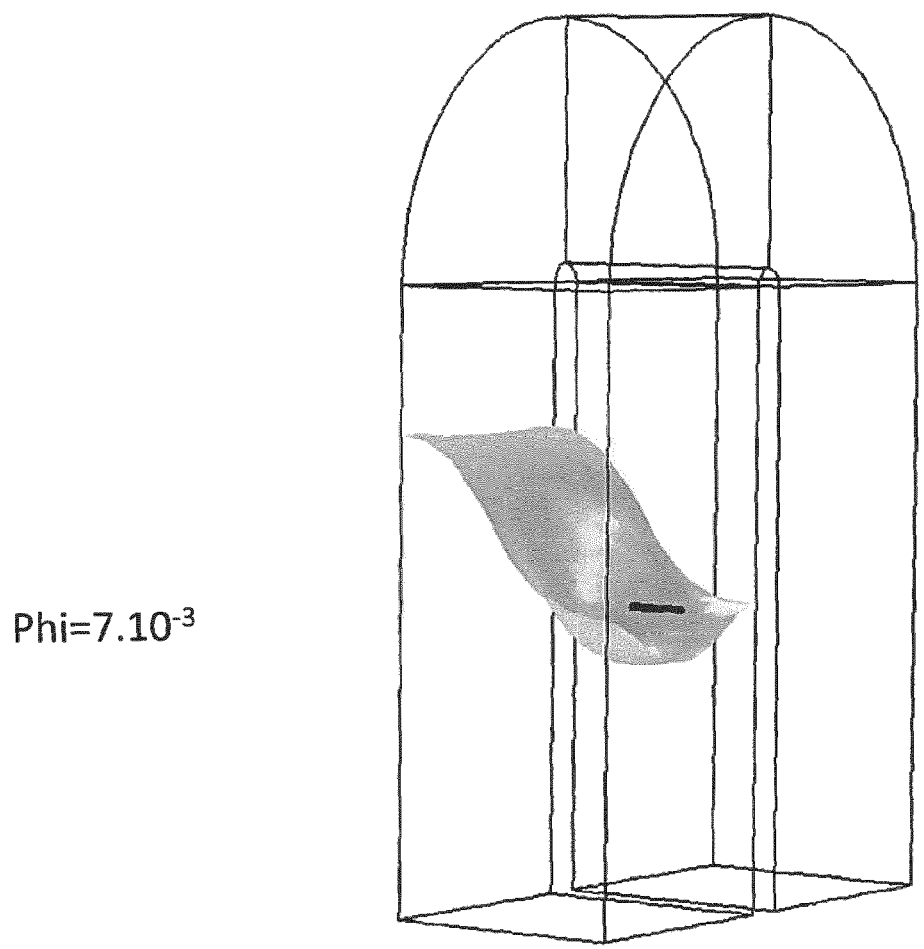
FIGS. 4, 5A and 5B show results of digital CFD (Computational Fluid Dynamics) simulations of the distribution of powdered abatement compound in the same furnace pipe, with a device and its corresponding method, according to the present invention (FIG. 4), in comparison to the prior art US 2013/0125749 (FIGS. 5A and 5B).

The results of this simulation are indicated in FIGS. 4 (the present invention) and 5 (prior art US 2013/0125749).

As can be observed in FIG. 4, when a flow of peripheral gas with a mass flow rate of 0.1 to 0.2% with respect to the flow rate of flue gases is used, according to the invention, a distribution factor identical to the optimal distribution factor ($Phi_d=7.10^{-3}$) is obtained in a transverse plane located 50 cm above the injection point. The present invention is therefore capable of injecting powdered slaked lime with the same penetrability as the penetrating nozzle but without using an invasive device.

However, when using the device and the method according to the patent application US 2013/0125749, a flow of peripheral gas having a very high flow rate with respect to the flue gas (mass flow rate of peripheral gas 10 times greater than that of the present invention) is generated, which creates great turbulence that is moreover desired by document US 2013/0125749. In this case, the zone in which the lime is uniformly distributed is very small, requiring, in order to achieve an optimal distribution factor of lime in the furnace pipe, at least three devices according to this prior art to be placed.

Figure 5A:
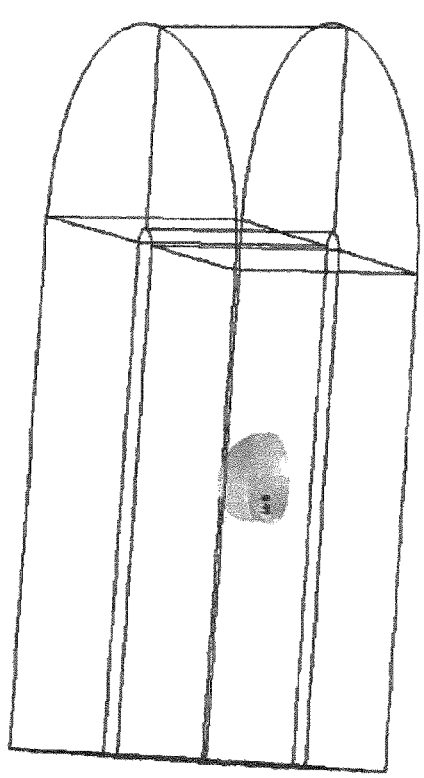
Figure 5B:
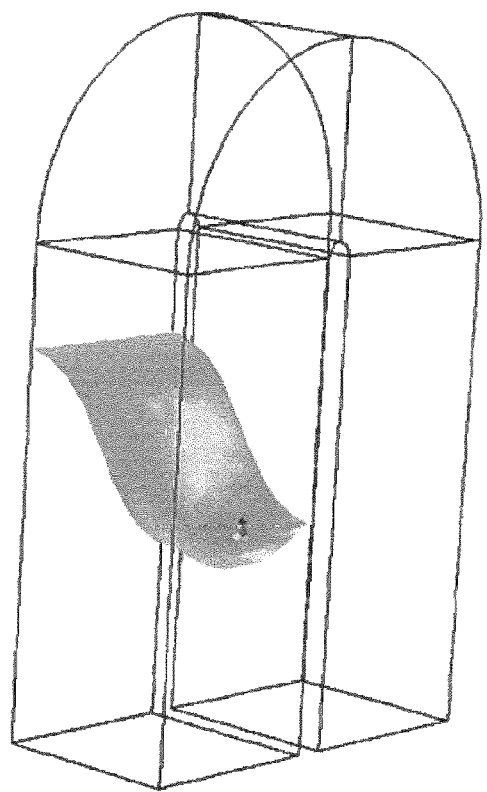

Indeed, as can be seen in FIG. 5A, the zone in which the lime is uniformly distributed is very concentrated. In this case, a single nozzle does not allow a $Phi=7.10^{-3}$ to be achieved in a transverse plane located 50 cm above the injection point Indeed, in this transverse plane, the distribution factor Phi is equal to $4.10^{-3}$ (FIG. 5B), which makes the dispersion of the lime 1.75 times less effective in comparison to the present invention.

Indeed, three devices according to the prior art US 2013/0125749 must be used in order to obtain a distribution equivalent to that of a single penetrating nozzle of the prior art.

EXAMPLES

In order to evaluate the efficiency of the dispersion obtained according to the present invention, the abatement of the $SO_2$ at a very high temperature by a powdered slaked lime as obtained according to the method described in document WO2007000433 has been studied.

In the temperature range between 850 and 1150° C., the $Ca(OH)_2$ hydrated lime reacts with $SO_2$ in order to form $CaSO_4$ according to the following equations:

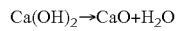

$$Ca(OH)_2 \rightarrow CaO + H_2O$$

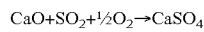

$$CaO + SO_2 + \tfrac{1}{2}O_2 \rightarrow CaSO_4$$

In this temperature range, the reaction between the calcium hydroxide and the $SO_2$ is selective and fast.

Selective because besides the $SO_2$, none of the other compounds present in the flue gases (such as $CO_2$) have a stable reaction product in the aforementioned temperature range. Indeed, for the needs of the experiment, even if the calcium hydroxide allows other acidic gases to be abated, only the neutralization of $SO_2$ by the calcium hydroxide is of interest in order to be able to dose the product of the reaction namely $CaSO_4$ and thus achieve the efficiency of the method studied, namely with respect to the stoichiometric ratio RS.

Fast because the speed of the reaction between the slaked lime and the $SO_2$ increases exponentially with the temperature according to the Arrhenius law. Thus, at 900° C., the time of contact between the acidic gases and the slaked lime can be less than 0.5 seconds.

Below, the results obtained under the following three conditions have been compared:

Comparative example 1: Pilot facility that can be considered to represent a situation of perfect mixture.

Comparative examples 2 and 3: Industrial facilities with injection of powdered slaked lime carried out via a metal penetrating nozzle according to the prior art.

Example: Industrial facility with injection of slaked lime carried out using the device of the present Invention.

The comparison was carried out for an abatement of 70% of the $SO_2$, which represents the average abatement desired for this type of method.

Comparative Example 1: Pilot Facility

The pilot facility allowed the change in the conversion of the $SO_2$ according to the stoichiometric ratio RS (number of moles of calcium hydroxide/number of moles of $SO_2$ at the input) in a perfect case, that is to say, in the absence of dust, to be measured, with a temperature perfectly distributed over the entire reaction zone and without a dead or turbulent zone. Such a pilot facility is also described in document WO2007000433.

The parameters of the flue gases present in the pilot facility are the following:

Total flow rate: 2 $Nm^3/h$

Temperature: 950° C.

$SO_2$ concentration: 1500 ppm $CO_2$ concentration: 10% vol $O_2$ concentration: 6% vol For the pilot facility, the stoichiometric ratio (RS) measured is 1.5 in order to obtain 70% conversion of the $SO_2$. It can thus be concluded therefrom that in the context of abatement of the $SO_2$ at a temperature between 850 and 1150° C., the RS of a perfect mixture will be close to 1.5 for 70% conversion of the $SO_2$.

Numerous industrial tests have been carried out using metal penetrating nozzles aimed at maximising the efficiency of the dispersion of the solid particles in the flow of flue gas.

The two comparative examples presented below use the highest conversion/RS ratios obtained up to now.

Comparative Example 2—Industrial Test with Metal Penetrating Nozzle (According to the Prior Art)

A slaked lime similar to that used in the pilot facility was injected at a speed of 15 m/s using a metal penetrating nozzle in a post-combustion chamber (furnace pipe), in which the combustion of the combustion residues takes place.

The parameters of the flue gases are the following:

Total flow rate: 46,750 $Nm^3/h$

Average temperature: 925° C.

Average $SO_2$ concentration: 450 ppm $CO_2$ concentration: 15% vol $O_2$ concentration: 10% vol The residence time of the hydrated lime in the furnace pipe is approximately 1 to 1.5 seconds. In the case of comparative example 2, the stoichiometric ratio measured is 2 in order to obtain 70% conversion of the $SO_2$.

Comparative Example 3.—Industrial Test with Metal Penetrating Nozzle (According to the Prior Art)

A slaked lime similar to that used in the pilot facility was injected at a speed of 15 m/s using a metal penetrating nozzle in a post-combustion chamber (furnace pipe).
The parameters of the flue gases are the following:
Total flow rate: 140,000 $Nm^3/h$
Average temperature: 925° C.
Average $SO_2$ concentration: 390 ppm
$CO_2$ concentration: 15% vol
$O_2$ concentration: 8% vol
The residence time of the hydrated lime in the furnace pipe is approximately 1 to 1.5 seconds. In the case of comparative example 3, the stoichiometric ratio measured is 2.3 In order to obtain 70% conversion of the $SO_2$.
The average stoichiometric ratio for comparative examples 2 and 3 is 2.1 for 70% conversion of the $SO_2$.

Figure 3:
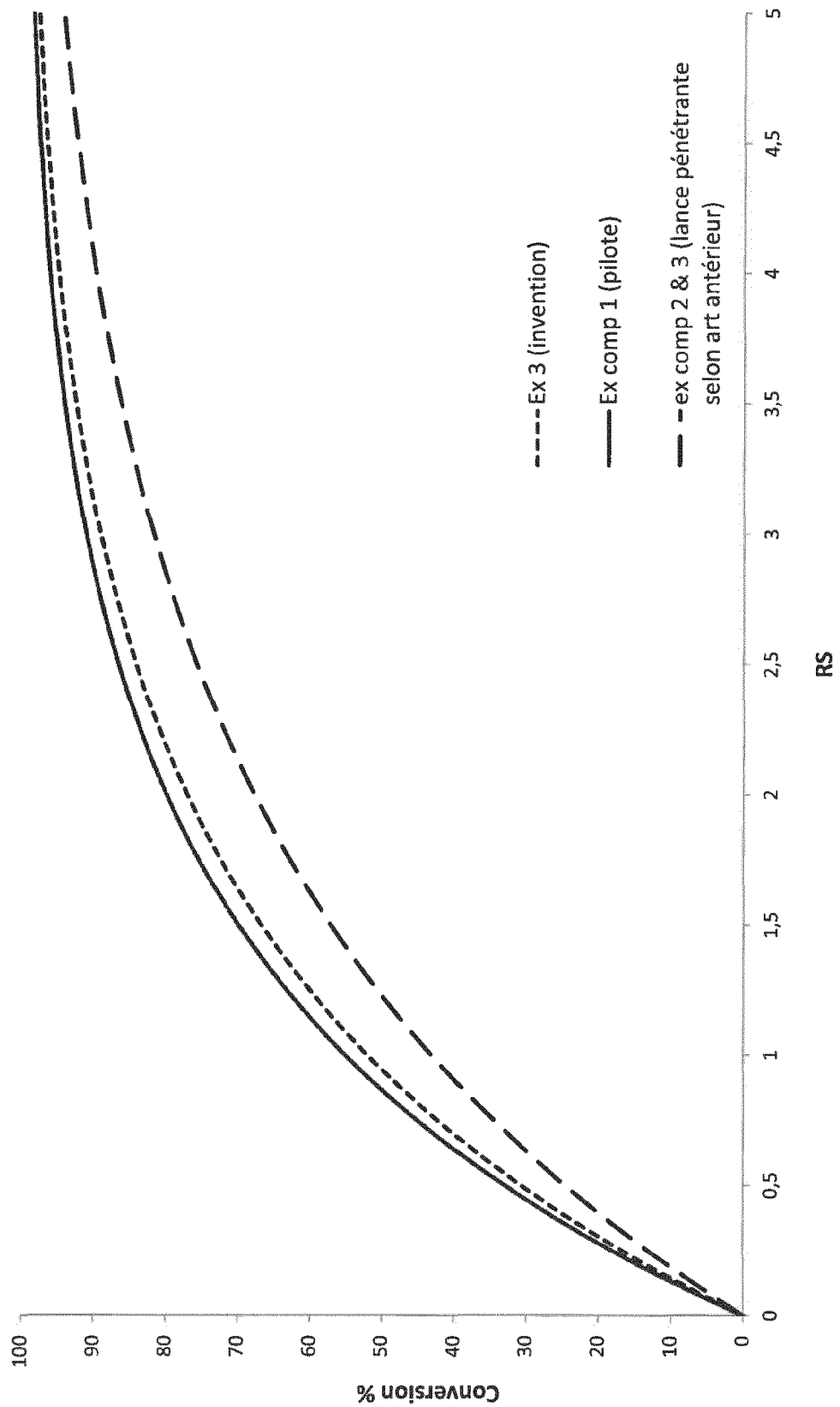
FIG. 3 shows a comparison of the desulphurisation performance of a pilot facility and of the industrial tests carded out either with a penetrating metal nozzle of the prior art or with the injection device of the present invention.

Example—Industrial Test Carried Out According to the Method of the Present Invention A slaked lime similar to that used in the pilot facility was injected using the device of the present invention into a post-combustion chamber (furnace pipe).
The parameters of the flue gases are the following:
Total flow rate: 82,000 $Nm^3/h$
Average temperature: 900° C.
Average $SO_2$ concentration: 395 ppm
$O_2$ concentration: 17% vol
$CO_2$ concentration: 15% vol
The parameters of the injection device are the following:
Diameter DT of the transportation pipe: 88.9 mm,
Diameter DP2 of the second portion of the peripheral pipe 222: 107.1 mm,
Speed of the transportation air $V_T$: 15 m/s,
Speed of the peripheral air $V_P$: 44 m/s,
Flow rate of the transportation air $Q_T$: 420 $Nm^3/h$,
Flow rate of the peripheral air $Q_P$: 290 $Nm^3/h$.
The residence time of the hydrated lime in the furnace pipe is 0.1 seconds.
The method according to the invention allowed stoichiometric ratios (RS) of 1.6 to be obtained for 70% abatement of the $SO_2$.
FIG. 3 repeats all of the results obtained with the pilot facility (comparative example 1); using the device of the present invention (example); and using a metal penetrating nozzle of the prior art (average of comparative examples 2 and 3).
As can be noted in FIG. 3, the values obtained according to the method of the present invention are close to the values obtained with the pilot facility.
As mentioned above, when the efficiency of the dispersion of the solid particles increases, the values measured on site move closer to the values obtained with the pilot.
These results show that the device and the method according to the present Invention allow, with an identical conversion rate, approximately 23% less powdered slaked lime to be used than with the metal penetrating nozzles of the prior art.
The efficiency of the dispersion of the solid particles in the fluid mixture is therefore better according to the device and the method of the invention than with the use of metal penetrating nozzles of the prior art. Moreover, the latter pose other problems in terms of transportation of the powder, safety, and ease of installation, also solved by the device and the method according to the invention.

The invention claimed is:
1. Device for injecting a powdered compound for abatement of pollutants of flue gases into a furnace pipe, said device comprising:
a chamber connected to a peripheral pipe and arranged to be connected to a first blowing element arranged to blow a peripheral gas into said chamber and into said peripheral pipe, and to said furnace pipe via said peripheral pipe,
said peripheral pipe comprising a first portion having a diameter DP1, connected to the chamber, and a second portion having a diameter DP2, opposite the first portion, having a downstream end, and intended to be in communication with the furnace pipe,
a transportation pipe for transporting powdered compound, intended to be connected to a second blowing element arranged to blow a transportation gas into said transportation pipe, simultaneously to the jet of peripheral gas, said transportation pipe having a diameter DT and a downstream end,
said transportation pipe passing through said first portion of the peripheral pipe concentrically and longitudinally, in such a way that the downstream end of said transportation pipe is located in a secant plane between the first and the second prion of the peripheral pipe,
wherein said transportation pipe passes through said chamber impermeably, and exits therefrom concentrically to the peripheral pipe inside said peripheral pipe,
wherein the second portion of the peripheral pipe has a length L greater than or equal to the diameter DP2 of the second portion of the peripheral pipe and in that the diameter DT of the transportation pipe and the diameter DP2 of the second portion of the peripheral pipe are linked by the following relationship:

$$0<DP2-DT<\tfrac{1}{2}DT.$$

2. Device for injecting a powdered compound according to claim 1, wherein the downstream end of the second portion of the peripheral pipe is arranged to be directly connected to the furnace pipe.
3. Device for injecting a powdered compound for abatement of pollutants of flue gases into a furnace pipe, said device comprising:
a chamber connected to a peripheral pipe and arranged to be connected to a first blowing element arranged to blow a peripheral gas into said chamber and into said peripheral pipe, and to said furnace pipe via said peripheral pipe,
said peripheral pipe composing a first portion having a diameter DP1, connected to the chamber, and a second portion having a diameter DP2, opposite the first portion, having a downstream end, and intended to be in communication with the furnace pipe,
a pipe for transporting powdered compound intended to be connected to a second blowing element arranged to blow a transportation gas into said transportation pipe, simultaneously to the jet of peripheral gas, said transportation pipe having a diameter DT and a downstream end,
said transportation pipe passing through said first portion of the peripheral pipe concentrically and longitudinally, in such a way that the downstream end of said transportation pipe is located in a secant plane between the first and the second portion of the peripheral pipe, and wherein the second portion of the peripheral pipe has a length L greater than or equal to the diameter DP2 of the second portion of the peripheral pipe and in that the diameter DT of the transportation pipe and the diameter DP2 of the second portion of the peripheral pipe are linked by the following relationship;

wherein the peripheral pipe further comprises a third portion comprising an upstream portion provided with an upstream end and a downstream portion provided with a downstream end, having a diameter DP3 less than the diameter DP2, said upstream end being intended to be connected to the downstream end of the second portion of the peripheral pipe, said downstream end being intended to be connected to the furnace pipe.

4. Device for injecting a powdered compound according to claim 3, wherein the downstream end of the third portion of the peripheral pipe is arranged to be directly connected to the furnace pipe.

5. Device for injecting a powdered compound according to claim 3, wherein said upstream portion of the third portion of the peripheral pipe has the shape of a truncated cone.

6. Device for injecting a powdered compound according to claim 1, further comprising:
   a first blowing element connected to the chamber and arranged to blow a peripheral gas into said chamber and into the peripheral pipe,
   a second blowing element connected to the transportation pipe and arranged to blow a transportation gas into said transportation pipe,
   a dosing apparatus for dosing powdered compound, connected to a tank of powdered compound and to the transportation pipe, downstream of said second blowing element with respect to a direction of flow of the transportation gas, arranged in order for the transportation gas to drive the dosed powdered compound.

7. Device for injecting a powdered compound according to claim 6, wherein said first blowing element and the second blowing element allow the adjustment of flow rates in such a way that the flow rates of the first blowing element and of the second blowing element can be adjusted separately.

8. Furnace pipe provided with at least one device for injecting, a powdered abatement compound according to claim 1.

9. Method for treating flue gases in a furnace pipe with a powdered compound for abatement of pollutants of flue gases using the device of claim 1, the method further, comprising the steps of:
   injection of a jet of transportation gas having a mass flow rate $Q_T$, into said transportation pipe, said jet of transportation gas being intended to transport said powdered abatement compound into said flue gases having a flue gas flow rate $Q_F$,
   simultaneously, injection of a jet of peripheral gas, from said first blower, through said chamber, into said peripheral pipe, thereby forming said jet of peripheral gas which is peripheral with respect to the jet of transportation gas, said jet of peripheral gas having a mass flow rate $Q_P$, and wherein said mass flow rate of peripheral gas in relation to said mass flow rate of the flue gases forms a ratio $Q_P/Q_F$ between 0.05 and 0.25%.

10. Method for treating flue gases in a furnace pipe according to claim 9, wherein said transportation gas has a speed $V_T$ and said peripheral gas has a speed $V_P$, the speed of peripheral gas $V_P$ being between two times and twenty times the speed of the transportation gas $V_T$ according to $2V_T \leq V_P \leq 20V_T$.

11. Method for treating flue gases in a furnace pipe according to claim 9, wherein the mass flow rate of the transportation gas $Q_T$ added to the mass flow rate of the peripheral gas $Q_P$ in relation to the mass flow rate of the flue gases $Q_F$ forms a ratio $(Q_T+Q_P)/Q_F$ between 0.1 and 0.5%.

12. Method for treating flue gases in a furnace pipe according to claim 9, wherein the powdered compound is injected at a mass flow rate $Q_A$, the mass flow rate of the transportation gas $Q_T$ in relation to the mass flow rate of powdered compound forming a ratio $Q_T/Q_A$ between 5 and 10.

13. Method for treating flue gases according to claim 9, wherein the injection of the jets of transportation gas and of peripheral gas occurs at the inner face of the furnace pipe.

14. Method for treating flue gases according to claim 9, wherein the temperature of the flue gases to be treated is between 850° C. and 1150° C.

15. Method for treating flue gases according to claim 9, wherein the speed of the flue gases to be treated is between 2 m/s and 150 m/s.

16. Method for treating flue gases according to claim 9, wherein the speeds of the jets of transportation gas and of peripheral gas are adjusted independently of each other.

17. Method for treating flue gases according to claim 9, wherein the transportation gas and/or the peripheral gas is air, independently of one another.

18. Method for treating flue gases according to claim 9, wherein the flue gases comprise pollutants selected from the group consisting of the acidic gases, said acidic gases including those which are sulphurated and/or halogenated, the heavy metals, the furans, the dioxins and their mixtures.

19. Method for treating flue gases according to claim 18, wherein the acidic gases comprise pollutants selected from the group consisting of $SO_2$, $SO_3$, HCl, HF, HBr, and their mixtures.

20. Method for treating flue gases according to claim 9, wherein the powdered abatement compound comprises a carbonate, a hydroxide and/or an oxide of an alkaline earth metal selected from the group consisting of calcium and magnesium, or a mixture thereof.

21. Method according to claim 9, wherein the powdered abatement compound comprises a calcium-magnesium compound having the formula $aCaCO_3$, $bMgC_3 \cdot xCaO \cdot yMgO \cdot zCa(OH)_2 \cdot tMg(OH)_2 \cdot ul$, where l represents impurities, a, b, x, y, z, t and u being mass fractions each between 0 and 100%, with u≤5%, with respect to the total weight of said calcium-magnesium compound, the sum of the mass fractions a+b+x+y+z+t+u being equal to 100% of the total weight of said calcium-magnesium compound.

22. Method for treating flue gases according to claim 9, wherein the powdered abatement compound comprises over 50% by weight $Ca(OH)_2$.

* * * * *